June 12, 1956  J. G. LAVIOLETTE  2,749,699
ELECTRIC CLOCK STARTER
Filed June 8, 1953

Inventor
J. G. Laviolette
By Hancock Downing Seebold
Attys.

2,749,699
ELECTRIC CLOCK STARTER

Jean Georges Laviolette, Besancon, France, assignor to Lip S. A. d'Horlogerie, Besancon, France Application June 8, 1953, Serial No. 359,985

Claims priority, application France June 7, 1952

1 Claim. (Cl. 58—28)

The present invention relates to a device for locking the driving balance of an electric clock in order that the clock may be stopped at the will of the user by stopping the balance in a position in which the electric circuit is broken.

In order that the invention may be understood, it is shown by way of non-limitative example in the accompanying drawing, wherein.

Figure 1:
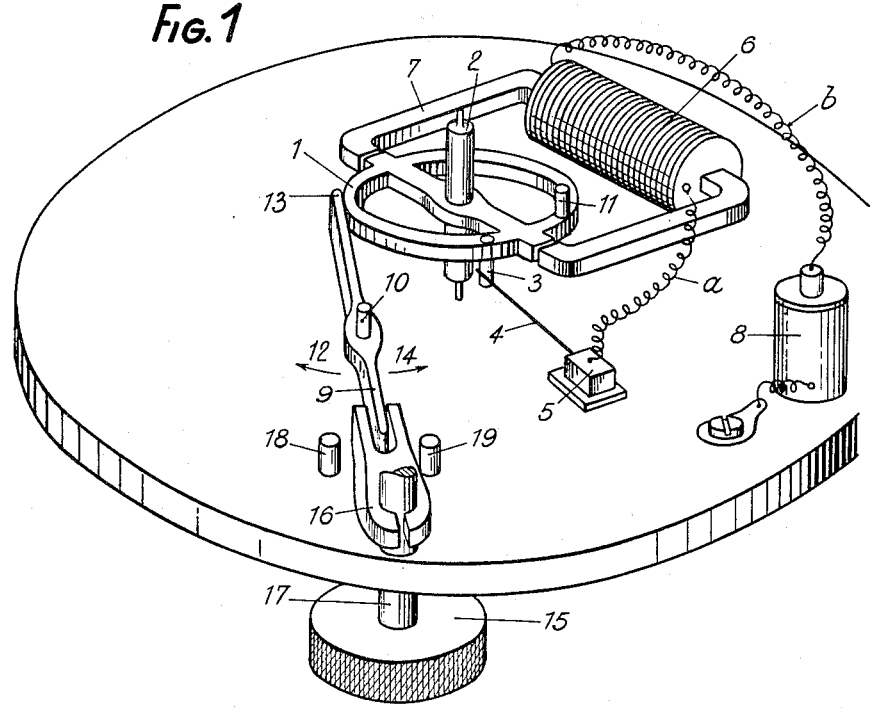
Figure 1 shows diagrammatically one embodiment of a driving balance comprising the balance wheel, the electromagnet and the operating device of the movable lever for locking the balance, in combination with the means for setting the clock.

The driving balance wheel 1 (Figure 1) may rotate about its arbor 2, on which is fixed the hair-spring, this not being shown so as to simplify the figure. This balance wheel 1 carries a pin 3 which may come into contact, during the rotation of the balance wheel 1, with the free end of a thin electrically conducting wire 4 embedded at its other end in a support 5 electrically insulated from the frame and electrically connected to one end $a$ of the coil 6 of an electromagnet 7, of which the balance wheel 1 forms the movable armature.

The other end $b$ of the coil is connected to one of the terminals of the battery 8, of which the other terminal is electrically connected to the frame and thus to the pin 3 by means of a hair spring (not shown).

The device for locking the balance wheel 1, given by way of non-limitative example, comprises a lever 9 movable about a spindle 10. The balance wheel carries a second pin 11.

The operation is as follows:

When the balance wheel 1 is oscillating normally its pin 3 comes into contact with the wire 4, which closes the electric circuit.

The invention has for its object to prevent the closing of the electric circuit, which is effected from 4 to 5 and to 6 through $a$, from 6 to 8 through $b$ and from 8 to 3 through the hair-spring and from 3 to 4 in order to close the circuit, by preventing the pin 3 from bearing on the wire 4, this being effected by blocking the balance wheel 1 by the co-operation of the pin 11 and the end 13 of the lever 9.

In order to stop the balance wheel 1, it is sufficient to cause the lever 9 to turn about its shaft 10 in the direction indicated by the arrow 12. In this movement, the end 13 of the lever 9 approaches the balance wheel 1. When it is sufficiently close to the said balance wheel 1, the pin 11 strikes against the end 13 of the lever 9 during the oscillating movement of the balance wheel 1, the result of which is immediately to stop the said balance wheel 1. The position of the pin 11 is chosen in such manner that this stop position is remote from the position of equilibrium of the said balance wheel 1 and that in the said position, the contact between the wire 4 and the pin 3 is interrupted. When the lever 9 is displaced away from the balance wheel 1 by causing it to turn about the shaft 10 in the direction of the arrow 14, the balance wheel 1 is freed and starts again of its own accord due to the fact that it is brought towards the position of equilibrium by the hair-spring (not shown).

The generic feature consists in the fact that the blocking of the balance wheel is utilized for preventing the passage of the current from 3 to 4 by keeping the finger 3 spaced from the wire 4.

In other words, the balance wheel comprises a pin 3 which may be called the closure stud, which closes the electric circuit with each oscillation, and a pin 11 (locking pin), which may be called the opening pin and keeps 3 spaced from 4 in order to prevent the closing of the circuit.

According to Figure 1, when the clock is set the wheel 15 is turned; this wheel 15 drives the train of wheels and the hands (not shown) and also causes the turning of the fork 16 held by friction on the spindle 17 of the wheel 15; this fork 16 acts on the lever 9 according to 12 or 14, the stops 18 and 19 limiting its displacement.

Figure 2:
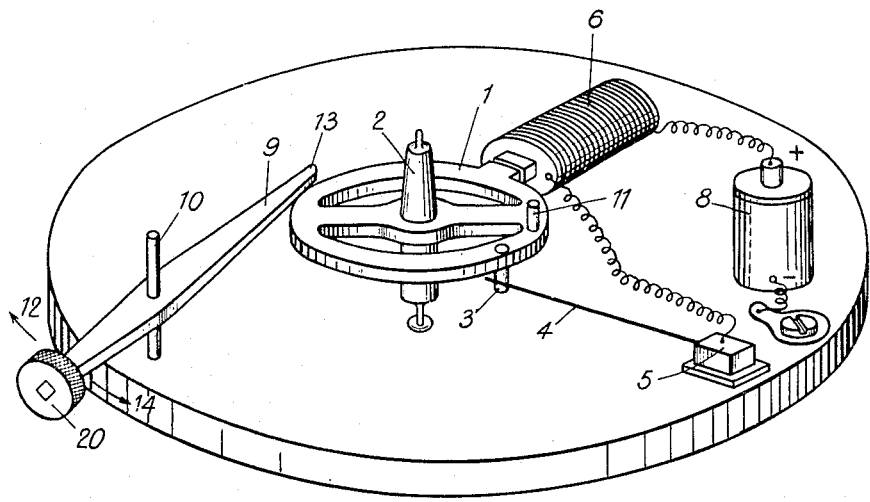
Figure 2 shows another non-limitative example of a device for stopping the balance wheel independently of the system ensuring the setting of the clock.

According to Figure 2, the displacement of the lever 9 for blocking the balance 1 is effected independently of the setting of the clock by means of a button 20.

I claim:

In an electric time-piece, the combination of a balance-wheel, an electro-magnet controlling the movements of said balance-wheel, a circuit feeding said electro-magnet and including a contact member, a first stud means on the balance-wheel adapted to engage periodically said contact member and to transiently close the said circuit over the electro-magnet, a second stud means on said wheel, a lever pivotally secured at a stationary point and adapted to be freely brought, when desired, into and out of the path of said second stud means to form a stop for the latter, said first and second stud means being so disposed relative to each other that said second stud means cooperates with said lever when said first stud means is remote from said contact member and said balance-wheel is remote from its rest position, and a time-setting knob on the outside of the time-piece, said lever being frictionally mounted on the axis of said knob in order to be shifted by the rotative movement of the latter between its operative and inoperative position.

References Cited in the file of this patent
UNITED STATES PATENTS

| 2,420,827 | Kennedy | May 20, 1947 |

FOREIGN PATENTS

| 156,507 | Switzerland | Oct. 17, 1932 |
| 833,874 | France | Aug. 1, 1938 |